(12) United States Patent
Jia et al.

(10) Patent No.: US 11,301,598 B2
(45) Date of Patent: Apr. 12, 2022

(54) METHOD AND SYSTEM FOR FAST DETERMINING TIME-DELAY STABILITY MARGIN OF POWER SYSTEM

(71) Applicant: TIANJIN UNIVERSITY, Tianjin (CN)

(72) Inventors: Hongjie Jia, Tianjin (CN); Chaoyu Dong, Tianjin (CN); Yilang Jiang, Tianjin (CN); Tao Jiang, Tianjin (CN); Lei Wang, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 537 days.

(21) Appl. No.: 16/318,104

(22) PCT Filed: Aug. 29, 2016

(86) PCT No.: PCT/CN2016/097114
§ 371 (c)(1),
(2) Date: Jan. 15, 2019

(87) PCT Pub. No.: WO2018/014417
PCT Pub. Date: Jan. 25, 2018

(65) Prior Publication Data
US 2021/0286917 A1    Sep. 16, 2021

(30) Foreign Application Priority Data

Jul. 21, 2016 (CN) .......................... 201610594776.X

(51) Int. Cl.
*G06F 30/20* (2020.01)
*H02J 13/00* (2006.01)
(Continued)

(52) U.S. Cl.
CPC ........... *G06F 30/20* (2020.01); *G01R 21/133* (2013.01); *G06F 17/16* (2013.01);
(Continued)

(58) Field of Classification Search
CPC ...... G06F 30/20; G06F 17/16; G06F 2119/06; G06F 2119/12; G06F 2111/10;
(Continued)

(56) References Cited

U.S. PATENT DOCUMENTS

| 7,647,213 B1* | 1/2010 | Gahinet | G06F 30/20 703/2 |
| 8,712,753 B1* | 4/2014 | Gahinet | G06F 30/20 703/19 |
| 2007/0150252 A1* | 6/2007 | Glass | G06F 11/3447 703/22 |

FOREIGN PATENT DOCUMENTS

| GN | 101408908 A | 4/2009 |
| GN | 101853005 A | 10/2010 |
| GN | 104967135 A | 10/2015 |

OTHER PUBLICATIONS

Weng. "Numerical Solution of Large-Scale Problems in Control system Design". Monash University, Australia. Sep. 2013. 175 Pages. (Year: 2013).*

(Continued)

*Primary Examiner* — Eunhee Kim
(74) *Attorney, Agent, or Firm* — Dragon Sun Law Firm, PC; Jinggao Li, Esq.

(57) ABSTRACT

The present disclosure discloses a method for fast determining a time-delay stability margin of a power system, which focuses on three steps, i.e., Jordan standardization, Taylor separation and Schur simplification, to reconstruct a new time delay system and reduce the system dimension. In this method, firstly, a time delay model is Jordan standardized; further, Taylor expansion is applied in a process for separating state variables with time delay from stage variables without time delay; then, balanced model reduction is realized by Schur simplification; and finally, a WSCC 3-generator-9-bus power system with multiple delays will be used to validate the proposed method via several typical criteria.

9 Claims, 4 Drawing Sheets

(51) Int. Cl.
*G01R 21/133* (2006.01)
*G06F 17/16* (2006.01)
*G06F 119/06* (2020.01)
*G06F 111/10* (2020.01)
*G06F 119/12* (2020.01)

(52) U.S. Cl.
CPC ..... *H02J 13/00002* (2020.01); *G06F 2111/10* (2020.01); *G06F 2119/06* (2020.01); *G06F 2119/12* (2020.01); *H02J 2203/20* (2020.01)

(58) Field of Classification Search
CPC .......... G06F 2119/02; G06F 17/13; H02J 13/00002; H02J 2203/20; H02J 3/00; G01R 21/133
See application file for complete search history.

(56) References Cited

OTHER PUBLICATIONS

Dai et al. "Scheduling-and-Control Codesign for a Collection of Networked Control Systems With Uncertain Delays". IEEE Transactions On Control Systems Technology, vol. 18, No. 1, Jan. 2010. pp. 66-78. (Year: 2010).*

Wang et al. "Quantized H∞ Control for Nonlinear Stochastic Time-Delay Systems With Missing Measurements". IEEE Transactions On Automatic Control, vol. 57, No. 6, Jun. 2012. pp. 1431-1444. (Year: 2012).*

Scarciotti. "Model Reduction of Neutral Linear and Nonlinear Time-Invariant Time-Delay Systems With Discrete and Distributed Delays". IEEE Transactions On Automatic Control, vol. 61, No. 6, Jun. 2016. pp. 1438-1451. (Year: 2016).*

Dong et al. "Effective method to determine time-delay stability margin and its application to power systems". IET Generation, Transmission & Distribution. ISSN 1751-8687. Mar. 2017. 10 Pages. (Year: 2017).*

Khalil et al. "A New Stability and Time-Delay Tolerance Analysis Approach for Networked Control Systems". 49th IEEE Conference on Decision and Control. Dec. 15-17, 2010. 6 Pages. (Year: 2010).*

Medvedeva et al. "Synthesis of Razumikhin and Lyapunov-Krasovskii approaches to stability analysis of time-delay systems". Automatica 51 (2015) 372-377. (Year: 2014).*

First Office Action for Chinese patent Application 201610594776.x.
Written Opinion of the International Search Authority from corresponding PCT/CN2016/097114.
International Search Report from corresponding PCT/CN2016/097114.

* cited by examiner

METHOD AND SYSTEM FOR FAST DETERMINING TIME-DELAY STABILITY MARGIN OF POWER SYSTEM

CROSS-REFERENCE TO RELATED APPLICATIONS

This application is a national stage application of International Patent Application PCT/CN2016/097114, filed Aug. 29, 2016, which itself claims the priority to Chinese Patent Application No. CN 201610594776.x, filed Jul. 21, 2016 in the National Intellectual Property Administration of P.R. China, both of which are expressly incorporated by reference herein in their entirety.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present invention relates to the technical field of Linear Matrix Inequality (LMI) and time-delay system stability analysis, and in particular relates to a method for fast determining a stability margin of a time-delay system.

BACKGROUND OF THE PRESENT DISCLOSURE

Wide Area Measurement System (WAMS), which is a real-time measuring system based on synchronous phasor measurement, aims to dynamically monitor, analyze and control bulk power systems. In the WAMS, the wide area control using the wide area measurement information is advantageous to improve the operating stability of the whole power system and realize the safe and stable operation of the power system. However, in the wide area control of power systems based on WAMS, since remote signals are required for feedback control, certain time delays exist in the wide area measurement signals, which may deteriorate the performance of controllers and result in the instability of the system. Therefore, it is essential to explore the impact of time delays from WAMS on the stability of power systems.

To explore the impact of time delays on the power systems, random variation of time delays, parameter incoherence, switching loops are taken into consideration. The direct method based on the Lyapunov stability theory and LMI has been widely used. In this method, the stability margin of the time-delay system can be directly obtained by constructing an energy function, so it is applied to the design of the controllers for time-delay systems and the like.

However, when the method is applied to the analysis and handling of time-delay problems in wide-area systems, the number of variables to be solved in this method is in an approximate square relationship with the number of state variables in the system. When there are more of state variables in the system, during the solution of the stability margin of the time-delay system, too many variables need to be solved, and the calculation time is too long. Therefore, how to decrease the number of variables to be solved and reduce the calculation time is very important. There have been some existing model simplification methods, such as, simplifying a complex system by a balanced reduction method through mean square root; and, for a non-minimum system, realizing model reduction by a Hankel minimum approximant simplification system and coprime factors. Those methods have successfully applied to the analysis of complicated dynamic systems. However, these existing simplification methods are mostly applied to systems without time delay. Due to the transcendental terms in the characteristic equations of time-delay systems, it is still very difficult to directly apply the existing simplification methods in the calculation process of the time delay stability.

Therefore, a heretofore unaddressed need exists in the art to address the aforementioned deficiencies and inadequacies.

SUMMARY OF THE PRESENT DISCLOSURE

To solve the above problems, the present disclosure provides a method for fast determining a time-delay stability margin of a power system. In this method, first, a system model with time delays is Jordan standardized; further, Taylor expansion is applied in the association separation of state variables with time delay from state variables without time delay; and then, balanced model reduction is realized by Schur simplification. Consequently, the calculation time of the time-delay stability margin is greatly reduced, and the accuracy of the final result of determination is ensured. Based on the Layapunov stability criteria, the time-delay stability margin of a WSCC 3-generator-9-bus power system is fast determined by the method of the present invention.

The present disclosure provides a method for fast determining a time-delay stability margin of a power system, wherein, for a time-delay power system with m time delays, a time-delay power system mathematical model is constructed and then simplified by Jordan standardization, Taylor separation and Schur simplification to obtain a simplified time-delay power system mathematical model, so that a time-delay stability margin of the time-delay power system is fast solved, and a maximum time delay that the power system can sustain without losing its stability is obtained, specifically:

step 1: constructing a time-delay power system mathematical model:

$$\begin{cases} \dfrac{dx(t)}{dt} = A_0 x(t) + \sum_{i=1}^{m} A_i x(t - \tau_i), \tau_i > 0 \\ x(t + \xi) = h(t, \xi), \xi \in [-\max(\tau_i), 0] \end{cases} \quad (1)$$

where t is a time variable; x(t) is a state variable;

$\dfrac{dx(t)}{dt}$ is the derivative of the state variable versus time; $A_0$ is a non-delay coefficient matrix; $A_i$ (where i=1, 2, ..., m) is a delay coefficient matrix; m is the number of time delays; $\tau_i$ (where i=1, 2, ..., m) is a delay constant of the system; $\tau_i > 0$ indicates that all time delays are greater than 0; x (t-$\tau_i$) (where i=i=1, 2, ..., m) is a delay state variable; h(t,ξ) is a historic trajectory of the state variable x(t); ξ∈[−max ($\tau_i$),0] indicates that the variable varies ξ between the opposite number of the maximum value of $\tau_i$ and 0; and, all algebraic variables belong to a real number field R, and all vector variables belong to an n-dimensional real number vector $R^n$;

step 2: summing up delay coefficient matrices $A_i$ (where $A_i$, i=1, 2, ..., m) in the step 1 and performing Jordan standardization by the sparity of the delay coefficient matrices, and performing row-column transformation on the time-delay power system mathematical model according to the sparity;

step 3: performing Taylor expansion on the delay state variable $\tilde{z}(t-\tau_i)$ subjected to the row-column transformation in the step 2, separating the correlation between the non-delay variable $\tilde{z}(t)$ and the delay variable $\tilde{z}(t-\tau_i)$ in the time-delay power system mathematical model after the Jordan standardization and the sparity row-column transformation;

step 4: simplifying the time-delay power system mathematical model by a Schur model, so that the number of state variables is decreased from n to r, and obtaining a simplified time-delay power system mathematical model; and step 5: based on the time-delay stability criteria for the power system, obtaining the time-delay stability margin of the time-delay power system with m time delays by the simplified time-delay power system mathematical model obtained in the step 4, thus achieving the fast determination of the time-delay stability margin of the power system, and obtaining the maximum time delay that the power system can sustain without losing its stability.

Compared with the prior art, the present application has the following beneficial effects.

For a wide-area power system with multiple time delays, the present invention provides a method for fast determining the time-delay stability margin of the power system (also referred to as JTS fast solution), which uses Jordan standardization, Taylor separation and Schur simplification to simplify the model for the time-delay power system. The simplified model can be suitable for various time-delay stability criteria. Thus, the calculation efficiency can be greatly enhanced, and the calculation performance can be improved.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION OF THE PRESENT DISCLOSURE

Figure 1:
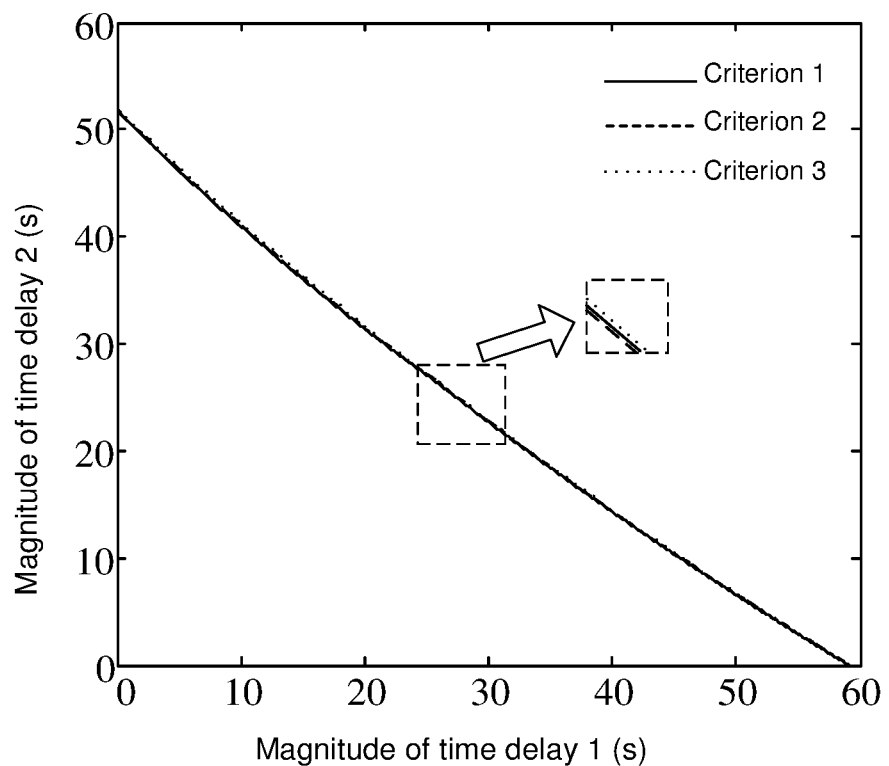
FIG. 1 is a diagram showing the time-delay stability margin of a WSCC 3-generator-9-bus power system which is directly calculated through three criteria.

The technical solutions of the present invention will be further described below in detail by specific embodiments with reference to the accompanying drawings. The specific embodiments to be described are merely for explaining the present invention, rather than limiting the present invention.

The present disclosure provides a method for fast determining a time-delay stability margin of a power system, wherein, for a time-delay power system with m time delays, a time-delay power system mathematical model is constructed and then simplified by Jordan standardization, Taylor separation and Schur simplification to obtain a simplified time-delay power system mathematical model, so that a time-delay stability margin of the time-delay power system is fast solved, and it is determined according to the time-delay stability margin whether the currently operated power system is stable, specifically:

Step 1: constructing a time-delay power system mathematical model, specifically:

Step 1-1: in a WSCC 3-generator-9-bus system, generators 2, 3 are treated as equivalent units of powder grid with wide-area control loop; assuming that a time delay $\tau_1$ exists in the feedback of the terminal voltage measured on a bus 2 to an excitation regulator, and a time delay $\tau_2$ exists in the feedback of the terminal voltage measured on a bus 3 to the excitation regulator, constructing a differential algebraic equation set of the power system with time delays:

$$\begin{cases} \dot{s} = f(s, s_1, s_2, y, y_1, y_2) \\ 0 = g(s, y) \\ 0 = g(s_i, y_i), \ i = 1, 2 \end{cases} \quad (1)$$

where $s \in R^n$ is an original state variable of the system, $y \in R^r$ is an original algebraic variable of the system, $s_i = s(t-\tau_i)$ (where i=1,2) is an original delay state variable of the system, $y_i = y(t-\tau_i)$ (where i=1,2) is an original delay algebraic variable of the system; and, $\tau_i \in R$ (where i=1,2) is a time delay constant of the system.

Step 1-2: linearizing the equation (2) in an equilibrium point ($x_e$, $y_e$) to obtain:

$$\begin{cases} \Delta \dot{s} = F_s \Delta s + F_y \Delta y + \Sigma_{i=1}^{2}(F_{si}\Delta s_i + F_{yi}\Delta y_i) \\ 0 = G_s \Delta s + G_y \Delta y \\ 0 = G_{si}\Delta s_i + G_{yi}\Delta y_i, \ i = 1, 2 \end{cases}, \text{where} \quad (2)$$

$$F_z = \frac{\partial f}{\partial z}, F_y = \frac{\partial f}{\partial y}, G_z = \frac{\partial g}{\partial z}, G_y = \frac{\partial g}{\partial y},$$

$$F_{zi} = \frac{\partial f}{\partial z_i}, F_{yi} = \frac{\partial f}{\partial y_i}, G_{zi} = \frac{\partial g}{\partial z_i}, \text{ and } G_{yi} = \frac{\partial g}{\partial y_i},$$

where i=1,2;

Step 1-3: without considering the singularity, $G_y$ and $G_{yi}$ in the equation (2) are invertible, expressing the equation (2) as:

$$\Delta \dot{s} = A_0 \Delta s + \Sigma_{i=1}^{m} A_i \Delta s(t-\tau_i) \quad (3),$$

where $A_0 = F_s - F_y G_y^{-1} G_s$ and $A_i = F_{si} - F_{yi} G_{yi}^{-1} G_{si}$;

Step 1-4: expressing the increment of the state variable by $x(t) = \Delta z$, rewriting the equation (3) as:

$$\frac{dx(t)}{dt} = A_0 x(t) + \sum_{i=1}^{2} A_i x(t-\tau_i); \quad (4)$$

Step 1-5: expressing the time-delay power system mathematical model as follows:

$$\begin{cases} \dfrac{dx(t)}{dt} = A_0 x(t) + \sum_{i=1}^{2} A_i x(t-\tau_i), \tau_i > 0 \\ x(t+\xi) = h(t,\xi), \xi \in [-\max(\tau_i), 0) \end{cases} \quad (5)$$

where t is a time variable; x(t) is a state variable;

$\dfrac{dx(t)}{dt}$ is the derivative of the state variable with regard to the time; $h(t,\xi)$ is a historic trajectory of the state variable x(t); $\xi \in [-\max(\tau_i), 0)$ indicates that the variable $\xi$ varies between the opposite number of the maximum value of $\tau_i$ and 0; all algebraic variables belong to a real number field R, and all vector variables belong to a 10-dimensional real number vector $R^{10}$ and, the specific numerical values of the non-delay coefficient matrix $A_0$ and delay coefficient matrix $A_1$ and $A_2$ are as follows:

$$A_0 = \begin{bmatrix} A_{11}^0 & A_{12}^0 \\ A_{21}^0 & A_{22}^0 \end{bmatrix} \quad (6)$$

$$A_{11}^0 = \begin{bmatrix} 0.00 & 377.00 & 0.00 & 0.00 & 0.00 \\ -0.15 & -0.00 & -0.03 & -0.11 & 0.00 \\ -0.02 & 0.00 & -0.26 & 0.05 & 0.17 \\ -1.87 & 0.00 & 0.24 & -5.02 & 0.00 \\ 0 & 0.00 & -2309.00 & 9592.00 & -50.00 \end{bmatrix},$$

$$A_{12}^0 = \begin{bmatrix} 000 & 0.00 & 0.00 & 0.00 & 0.00 \\ 0.10 & 0.00 & 0.11 & 0.06 & 0.00 \\ 0.15 & 0.00 & 0.46 & 0.01 & 0.00 \\ 0.92 & 0.00 & 0.26 & 0.75 & 0.00 \\ 0.00 & 0.00 & 0.00 & 0.00 & 0.00 \end{bmatrix}$$

$$A_{21}^0 = \begin{bmatrix} 0.00 & 0.00 & 0.00 & 0.00 & 0.00 \\ 0.21 & 0.00 & 0.19 & 0.12 & 0.00 \\ 0.13 & 0.00 & 0.35 & 0.02 & 0.00 \\ 2.41 & 0.00 & 0.43 & 1.85 & 0.00 \\ -250.80 & 0.00 & -814.20 & 13.59 & 0.00 \end{bmatrix}$$

$$A_{21}^0 = \begin{bmatrix} 0.00 & 377 & 0.00 & 0.00 & 0.00 \\ -0.36 & -0.01 & -0.09 & -0.30 & 0.00 \\ -0.01 & 0.00 & -0.14 & 0.02 & 0.13 \\ -5.69 & 0.00 & -0.24 & -14.22 & 0.00 \\ -139.90 & 0.00 & 2402.92 & 486.00 & -50.00 \end{bmatrix}$$

$$A_1 = \begin{bmatrix} A_{11}^1 & A_{12}^1 \\ A_{21}^1 & A_{22}^1 \end{bmatrix} \quad (7)$$

$$A_{11}^1 = \begin{bmatrix} 0.00 & 0.00 & 0.00 & 0.00 & 0.00 \\ 0.00 & 0.00 & 0.00 & 0.00 & 0.00 \\ 0.00 & 0.00 & 0.00 & 0.02 & 0.00 \\ 0.00 & 0.00 & 0.00 & 0.00 & 0.00 \\ -2358.00 & 0.00 & 2272.00 & -593.70 & 0.00 \end{bmatrix},$$

$$A_{12}^1 = \begin{bmatrix} 0.00 & 0.00 & 0.00 & 0.00 & 0.00 \\ 0.00 & 0.00 & 0.00 & 0.00 & 0.00 \\ 0.00 & 0.00 & 0.00 & 0.00 & 0.00 \\ 0.00 & 0.00 & 0.00 & 0.00 & 0.00 \\ -173.70 & 0.00 & -942.80 & 87.00 & 0.00 \end{bmatrix}$$

$$A_{21}^1 = O_{5\times 5}, \quad A_{22}^1 = O_{5\times 5}$$

$$A_2 = \begin{bmatrix} A_{11}^2 & A_{12}^2 \\ A_{21}^2 & A_{22}^2 \end{bmatrix} \quad A_{11}^2 = O_{9\times 5}, A_{12}^2 = O_{9\times 5} \quad (8)$$

$$A_{21}^2 = [-250.80 \quad 0.00 \quad -814.20 \quad 13.59 \quad 0.00],$$
$$A_{22}^2 = [-123.90 \quad 0.00 \quad 32.49 \quad -343.20 \quad 0.00].$$

Step 2: summing up delay coefficient matrices $A_i$ (where i=1,2) in the time-delay power system mathematical model and performing Jordan standardization by the sparity of the delay coefficient matrices $A_1$ $A_2$, and performing row-column transformation according to the sparity, specifically:

Step 2-1: accumulating the delay coefficient matrix $A_i$ (where i=1,2) to obtain $$\sum_{i=1}^{2} A_i.$$

Step 2-2: performing a Jordan standardization to the result of accumulation $$\sum_{i=1}^{m} A_i,$$

that is, performing row-column transformation on the sum of the delay coefficient matrix $A_i$ (where i=1,2):

$$T\left(\sum_{i=1}^{m} A_i\right) T^{-1} = J, \quad (9)$$

where T is a row-column transformation matrix;

Step 2-3: performing a row-row transformation on the first equation $$\frac{dx(t)}{dt} = A_0 x(t) + \sum_{i=1}^{2} A_i x(t-\tau_i)$$

constructed in the step 1 to obtain:

$$\frac{dTx(r)}{dt} = TA_0 x(t) + T\sum_{i=1}^{2} A_i x(t - \tau_i); \qquad (10)$$

Step 2-4: performing a variable substitution on the state variable x(r), setting Tx(t)=z(t), and substituting x(t)=T$^{-1}$z(r) and x(t-$\tau_i$)=T$^{-1}$z(t-$\tau_i$) into the equation (10) to obtain:

$$\frac{dz(t)}{dt} = A_{0J} z(t) + \sum_{i=1}^{2} A_{iJ} z(t - \tau_i); \qquad (11)$$

Step 2-5: according to the sparity of the delay coefficient matrix $A_d$ in the equation (11), performing row-column transformation on the delay coefficient matrix $A_{i,J}$ based on the following transformation rule: for any variable $z_k$ (where $1 \leq k \leq 10$), if the value of an element $A_{i,J}$ (i, j) or $A_{i,J}$ (j, i) (where $1 \leq i \leq 2$ and $1 \leq j \leq 10$) in $A_{i,J}$ is 0, successively arranging the variable $z_k$ as the last variable in the sequence of stage variables to obtain a rearranged state variable $\tilde{z}(t)=[\tilde{z}^T_{res}(t)\ \tilde{z}^T_{unres}(t)]^T$, where $\tilde{z}_{res}(t) \in R^4$ and $\tilde{z}_{unres}(t) \in R^6$; hence, obtaining the following equation according to the transformation rule:

$$\begin{bmatrix} \dot{\tilde{z}}_{res}(t) \\ \dot{\tilde{z}}_{unres}(t) \end{bmatrix} = \tilde{A}_0 \begin{bmatrix} \tilde{z}_{res}(t) \\ \tilde{z}_{unres}(t) \end{bmatrix} + \sum_{i=1}^{2} \tilde{A}_i \begin{bmatrix} \tilde{z}_{res}(t - \tau_i) \\ \tilde{z}_{unres}(t - \tau_i) \end{bmatrix}, \qquad (12)$$

where $$\tilde{A}_i = \begin{bmatrix} \tilde{A}_{i1}^1 & O_{4 \times 6} \\ O_{6 \times 4} & O_{6 \times 6} \end{bmatrix};$$

The time-delay power system mathematical model subjected to the Jordan standardization and sparity row-column transformation is expressed as follows:

$$\begin{cases} \frac{d\tilde{z}(t)}{dt} = \tilde{A}_0 \tilde{z}(t) + \sum_{i=1}^{2} \tilde{A}_i \tilde{z}(t - \tau_i), \tau_i > 0 \\ \tilde{z}(t + \xi) = \tilde{h}(t, \xi), \xi \in [-\tau_i, 0) \end{cases}; \qquad (13)$$

Step 3: performing a Taylor expansion on the delay state variable $\tilde{z}(t-\tau_i)$ subjected to the row-column transformation in the step 2, separating the correlation between the non-delay variable $\tilde{z}(t)$ and the delay variable $\tilde{z}(t-\tau_i)$ in the time-delay power system mathematical model after the Jordan standardization and the sparity row-column transformation.

Step 3-1: performing a Taylor expansion on the delay state variable $\tilde{Z}_{res}(t-\tau_i)$ in the equation (13):

$$\begin{bmatrix} \tilde{z}_{res}(t - \tau_i) \\ \tilde{z}_{unres}(t - \tau_i) \end{bmatrix} = \begin{bmatrix} \tilde{z}_{res}(t) \\ \tilde{z}_{unres}(t) \end{bmatrix} - \tau_i \begin{bmatrix} \dot{\tilde{z}}_{res}(t) \\ \dot{\tilde{z}}_{unres}(t) \end{bmatrix} + \sum_{l=2}^{\infty} \frac{(-\tau_i)^l}{l!} \begin{bmatrix} \tilde{z}_{res}^{(l)}(t) \\ \tilde{z}_{unres}^{(l)}(t) \end{bmatrix}. \qquad (14)$$

Step 3-2: substituting the first equation $$\frac{d\tilde{z}(t)}{dt} = \tilde{A}_0 \tilde{z}(t) + \sum_{i=1}^{2} \tilde{A}_i \tilde{z}(t - \tau_i)$$

in the equation (13) into the equation (14) to obtain:

$$\begin{bmatrix} \dot{\tilde{z}}_{res}(t) \\ \dot{\tilde{z}}_{unres}(t) \end{bmatrix} = \tilde{A}_0 \begin{bmatrix} \tilde{z}_{res}(t) \\ \tilde{z}_{unres}(t) \end{bmatrix} + \qquad (15)$$

$$\sum_{i=1}^{2} \tilde{A}_i \left\{ \begin{bmatrix} \tilde{z}_{res}(t) \\ \tilde{z}_{unres}(t) \end{bmatrix} - \tau_i \begin{bmatrix} \dot{\tilde{z}}_{res}(t) \\ \dot{\tilde{z}}_{unres}(t) \end{bmatrix} + \sum_{l=2}^{\infty} \frac{(-\tau_i)^l}{l!} \begin{bmatrix} \tilde{z}_{res}^{(l)}(t) \\ \tilde{z}_{unres}^{(l)}(t) \end{bmatrix} \right\};$$

Step 3-3: combining similar variables in the equation (15):

$$\left\{ I_{10 \times 10} + \sum_{i=1}^{2} \tau_i \begin{bmatrix} \tilde{A}_{i1}^1 & O_{4 \times 6} \\ O_{6 \times 4} & O_{6 \times 6} \end{bmatrix} \right\} \cdot \begin{bmatrix} \dot{\tilde{z}}_{res}(t) \\ \dot{\tilde{z}}_{unres}(t) \end{bmatrix} \qquad (16)$$

$$\Box\Box = \left\{ \tilde{A}_0 + \sum_{i=1}^{2} \begin{bmatrix} \tilde{A}_{i1}^1 & O_{4 \times 6} \\ O_{6 \times 4} & O_{6 \times 6} \end{bmatrix} \right\} \cdot \begin{bmatrix} \tilde{z}_{res}(t) \\ \tilde{z}_{unres}(t) \end{bmatrix} +$$

$$\sum_{i=1}^{2} \begin{bmatrix} \tilde{A}_{i1}^1 & O_{4 \times 6} \\ O_{6 \times 4} & O_{6 \times 6} \end{bmatrix} \cdot \left\{ \sum_{l=2}^{\infty} \frac{(-\tau_i)^l}{l!} \begin{bmatrix} \tilde{z}_{res}^{(l)}(t) \\ \tilde{z}_{unres}^{(l)}(t) \end{bmatrix} \right\},$$

where, since $$\left\{ I_{10 \times 10} + \sum_{i=1}^{2} \tau_i \begin{bmatrix} \tilde{A}_{i1}^1 & O_{4 \times 6} \\ O_{6 \times 4} & O_{6 \times 6} \end{bmatrix} \right\}$$

is invertible, multiplying both sides of the equation (16) by the inverse matrix of $$\left\{ I_{10 \times 10} + \sum_{i=1}^{2} \tau_i \begin{bmatrix} \tilde{A}_{i1}^1 & O_{4 \times 6} \\ O_{6 \times 4} & O_{6 \times 6} \end{bmatrix} \right\}$$

to obtain a time-delay power system mathematical model subjected to the Taylor separation:

$$\begin{bmatrix} \dot{\tilde{z}}_{res}(t) \\ \dot{\tilde{z}}_{unres}(t) \end{bmatrix} = \left\{ I_{10 \times 10} + \sum_{i=1}^{2} \tau_i \begin{bmatrix} \tilde{A}_{i1}^1 & O_{4 \times 6} \\ O_{6 \times 4} & O_{6 \times 6} \end{bmatrix} \right\}^{-1} \cdot \qquad (17)$$

$$\left\{ \tilde{A}_0 + \sum_{i=1}^{2} \begin{bmatrix} \tilde{A}_{i1}^1 & O_{4 \times 6} \\ O_{6 \times 4} & O_{6 \times 6} \end{bmatrix} \right\} \cdot \begin{bmatrix} \tilde{z}_{res}(t) \\ \tilde{z}_{unres}(t) \end{bmatrix} +$$

$$\left\{ I_{10 \times 10} + \sum_{i=1}^{2} \tau_i \begin{bmatrix} \tilde{A}_{i1}^1 & O_{4 \times 6} \\ O_{6 \times 4} & O_{6 \times 6} \end{bmatrix} \right\}^{-1} \cdot$$

-continued $$\sum_{i=1}^{2}\begin{bmatrix} \bar{A}_{i1}^{1} & O_{4\times 6} \\ O_{6\times 4} & O_{6\times 6} \end{bmatrix} \cdot \left\{ \sum_{l=2}^{\infty} \frac{(-\tau_i)^l}{l!} \begin{bmatrix} \tilde{z}_{res}^{(l)}(t) \\ z_{unres}^{l}(t) \end{bmatrix} \right\} =$$

$$\left\{ I_{10\times 10} + \sum_{i=1}^{2} \tau_i \begin{bmatrix} \bar{A}_{i1}^{1} & O_{4\times 6} \\ O_{6\times 4} & O_{6\times 6} \end{bmatrix} \right\}^{-1} \cdot \left\{ \bar{A}_0 + \sum_{i=1}^{2} \begin{bmatrix} \bar{A}_{i1}^{1} & O_{4\times 6} \\ O_{6\times 4} & O_{6\times 6} \end{bmatrix} \right\} \cdot \left[ \begin{bmatrix} \tilde{z}_{res}(t) \\ \tilde{z}_{unres}(t) \end{bmatrix} \right] + \left\{ I_{10\times 10} + \sum_{i=1}^{2} \tau_j \begin{bmatrix} \bar{A}_{i1}^{1} & O_{4\times 6} \\ O_{6\times 4} & O_{6\times 6} \end{bmatrix} \right\}^{-1} \cdot \sum_{i=1}^{2} \begin{bmatrix} \bar{A}_{i1}^{1} \\ O_{6\times 4} \end{bmatrix} \cdot \left\{ \sum_{l=2}^{\infty} \frac{(-\tau_i)^l}{l!} \begin{bmatrix} \tilde{z}_{res}^{(l)}(t) \\ z_{unres}^{(l)}(t) \end{bmatrix} \right\}.$$

Step 4: simplifying the time-delay power system mathematical model by Schur simplification, so that the number of state variables is decreased from 10 to 4, and obtaining a simplified time-delay power system mathematical model, specifically:

Step 4-1: converting the time-delay power system mathematical model into an input-output form:

$$\begin{cases} \dot{\tilde{z}}(t) = \bar{A}_0 \tilde{z}(t) + \bar{B}_0 u(t) \\ y(t) = [I_{4\times 4} \; O_{4\times 6}]\tilde{z}(t) \end{cases} \quad (18)$$

where $$\bar{A}_0 = \left\{ I_{10\times 10} + \sum_{i=1}^{2} \tau_i \begin{bmatrix} \bar{A}_{i1}^{1} & O_{4\times 6} \\ O_{6\times 4} & O_{6\times 6} \end{bmatrix} \right\}^{-1} \cdot \left\{ \bar{A}_0 + \sum_{i=1}^{2} \begin{bmatrix} \bar{A}_{i1}^{1} & O_{4\times 6} \\ O_{6\times 4} & O_{6\times 6} \end{bmatrix} \right\}$$

$$\bar{B}_0 = [\bar{B}_1 \; \bar{B}_2]$$

$$\bar{B}_i = \left\{ I_{10\times 10} + \sum_{i=1}^{2} \tau_i \begin{bmatrix} \bar{A}_{i1}^{1} & O_{4\times 6} \\ O_{6\times 4} & O_{6\times 6} \end{bmatrix} \right\}^{-1} \cdot \sum_{i=1}^{2} \begin{bmatrix} \bar{A}_{i1}^{1} \\ O_{6\times 4} \end{bmatrix},$$

$$i = 1, 2$$

$$u = [u_1^T \; u_2^T], i = 1, 2, u_i(t) = \sum_{l=2}^{\infty} \frac{(-\tau_i)^l}{l!} z_{res}^{(l)}(t).$$

Step 4-2: performing Schur simplification in the equation (18) to decrease the number of state variables from 10 to 4:

$$\begin{cases} \dot{z}_{red}(t) = A_{red} z_{red}(t) + B_{red} u(t) \\ y(t) = C_{red} z_{red}(t) \end{cases} \quad (19)$$

where $z_{red}(t) \in R^4$, $y(t) \in R^4$, $A_{red} \in R^{4\times 4}$, $B_{red,i} \in R^{4\times 4}$, $C_{red} \in R^{4\times 4}$, and $B_{red} = [B_{red,1} \; B_{red,2}]$.

Step 4-3: in accordance with the equation (18), substituting $y(t) = \tilde{z}_{res}(t)$ into the equation (19):

$$\begin{cases} \dot{z}_{red}(t) = A_{red} z_{red}(t) + B_{red} u(t) \\ \tilde{z}_{rez}(t) = C_{red} z_{red}(t) \end{cases} ; \quad (20)$$

Step 4-4: substituting the second equation $\tilde{z}_{res}(t) = C_{red} z_{red}(t)$ in the equation (20) into the first equation to obtain: $\dot{z}_{red}(t) = A_{red} z_{red}(t) + B_{red} u(t)$ to obtain $$\dot{\tilde{z}}_{res}(t) = C_{red} A_{red} C_{red}^{-1} \tilde{z}_{res}(t) + C_{red} B_{red} u(t)| \quad (21)$$

Step 4-5: expanding each input component $u_i(t)$ of input u(t) in the equation (18) according to the Taylor separation:

$$u_i(t) = \sum_{l=2}^{\infty} \frac{(-\tau_i)^l}{l!} z_{res}^{(j)}(t) \quad (22)$$

$$u_i(t) = \sum_{l=0}^{\infty} \frac{(-\tau_i)^l}{l!} z_{res}^{(l)}(t) - z_{res}^{(0)}(t) - \frac{(-\tau_i)^1}{1!} z_{res}^{(1)}(t)$$

$$u_i(t) = \tilde{z}_{res}(t - \tau_i) - \tilde{z}_{res}(t) + \tau_i \dot{\tilde{z}}_{res}(t).$$

Step 4-6: substituting all input components into the equation (21) to obtain a simplified time-delay power system mathematical model:

$$\begin{cases} \dfrac{d\tilde{z}_{res}(t)}{dt} = A_{0,res} \tilde{z}_{res}(t) + \sum_{i=1}^{2} A_{i,res} \tilde{z}_{res}(t - \tau_i) \\ x(t + \xi) = h(t, \xi), \xi \in [-\max(\tau_i), 0) \end{cases} \quad (23)$$

where $$A_{0,res} = \left( I_{4\times 4} - \sum_{i=1}^{2} \tau_i C_{red} B_{red,i} \right)^{-1} \left( C_{red} A_{red} C_{red}^{-1} - \sum_{i=1}^{2} C_{red} B_{red,i} \right),$$

$$A_{i,res} = \left( I_{r\times r} - \sum_{i=1}^{2} \tau_i C_{red} B_{red,i} \right)^{-1} C_{red} B_{red,i};$$

Step 5: based on the time-delay stability criteria for the power system, obtaining the time-delay stability margin of the time-delay power system with 2 time delays by the simplified time-delay power system mathematical model obtained in the step 4, thus obtaining the maximum time delay allowed for the stable operation of the power system. The time-delay stability criteria for the power system include one of the following situations:

(1) Layapunov stability criteria; and (2) Eigenvalue analysis stability criteria.

The effects of the method will be described below by taking three specific Layapunov stability criteria as example.

The time-delay stability margin of the WSCC 3-generator-9-bus power system with two time delays is obtained by the simplified time-delay power system mathematical model obtained in the step 4, and the results obtained by the JTS fast solution method of the present invention are compared with the results directly obtained by the criteria. Three typical criteria among the Layapunov stability criteria will be specifically described as below.

Criterion 1 is a multi-delay stability criterion for the power system containing free-weighting matrices.

Criterion 1: For a system with m time delays, if there exist positive definite matrices $P \in R^{n\times n}$ and $Q_i \in R^{n\times n}$ (where i=1, 2, . . . , m), semi-positive definite matrices $W_{i,j} \in R^{n\times n}$, symmetric matrices $X_{i,j} \in R^{(m+1)n\times (m+1)n}$ (where $0 \leq i \leq j \leq m$)

and proper matrices $N_k^{i,j} \in R^{n \times n}$ (where $0 \le i < j \le m$ and $i=1, 2, \ldots, m, m+1$), the following matrix inequality is established:

$$S = \begin{bmatrix} S_{1,1} & \cdots & S_{1,m} & S_{1,m+1} \\ \vdots & \ddots & \cdots & \cdots \\ S_{1,m}^T & \vdots & S_{m,m} & S_{m,m+1} \\ S_{1,m+1}^T & \vdots & S_{m,m+1}^T & S_{m+1,m+1} \end{bmatrix} < O \tag{28}$$

$$M_{i,j} \ge O, \ 0 \le i < j \le m, \tag{29}$$

where $$S_{1,1} = PA_0 + A_0^T P + \sum_{k=1}^{m} Q_k + \sum_{k=0}^{m-1} \sum_{l=k+1}^{m} (\tau_l - \tau_k) A_0^T W_{k,l} A_0 +$$

$$\sum_{k=0}^{m-1} \sum_{l=k+1}^{m} (\tau_l - \tau_k) X_{1,1}^{k,l} + \sum_{k=1}^{m} N_1^{0,k} + \sum_{k=1}^{m} \left(N_1^{0,k}\right)^T$$

$$S_{m+1,m+1} = -Q_m + \sum_{k=0}^{m-1} \sum_{l=k+1}^{m} (\tau_l - \tau_k) A_m^T W_{k,l} A_m -$$

$$\sum_{k=0}^{m-1} N_m^{k,m} + \sum_{k=0}^{m-1} \sum_{l=k+1}^{m} (\tau_l - \tau_k) X_{m+1,m+1}^{k,l} - \sum_{k=0}^{m-1} \left(N_m^{k,m}\right)^T$$

$$S_{i,i} = -Q_{i-1} + \sum_{k=0}^{m-1} \sum_{l=k+1}^{m} (\tau_l - \tau_k) A_{i-1}^T W_{k,l} A_{i-1} +$$

$$\sum_{k=i}^{m} N_i^{i-1,k} + \sum_{k=0}^{m-1} \sum_{l=k+1}^{m} (\tau_l - \tau_k) X_{i,i}^{k,l} + \sum_{k=i}^{m} \left(N_i^{i-1,k}\right)^T -$$

$$\sum_{k=0}^{i-2} N_i^{k,i-1} - \sum_{k=0}^{i-2} \left(N_i^{k,i-1}\right)^T, \ i=2,3,\ldots,m-1,m$$

$$S_{1,j} =$$
$$PA_{j-1} + \sum_{k=0}^{m-1} \sum_{l=k+1}^{m} (\tau_l - \tau_k) A_0^T W_{k,l} A_{j-1} + \sum_{k=j}^{m} N_1^{j-1,k} - \sum_{k=0}^{j-2} N_1^{k,j-1} +$$

$$\sum_{k=0}^{m-1} \sum_{l=k+1}^{m} (\tau_l - \tau_k) X_{1,j}^{k,l} + \left(\sum_{k=i}^{m} N_j^{0,k}\right)^T i=2,3,\ldots,m,m$$

$$S_{i,j} = \sum_{k=0}^{m-1} \sum_{l=k+1}^{m} (\tau_l - \tau_k) A_{i-1}^T W_{k,l} A_{j-1} + \sum_{k=0}^{m-1} \sum_{l=k+1}^{m} (\tau_l - \tau_k) X_{i,j}^{k,l} +$$

$$\sum_{k=j}^{m} N_i^{j-1,k} - \sum_{k=0}^{j-2} N_i^{k,j-1} + \left(\sum_{k=i}^{m} N_j^{i-1,k}\right)^T - \left(\sum_{k=0}^{i-2} N_j^{k,j-1}\right)^T i=2,$$
$$3,\ldots,m-1, \ j=i+2,i+3,\ldots,m,m+1$$

$$S_{1,m+1} = PA_m + \sum_{k=0}^{m-1} \sum_{l=k+1}^{m} (\tau_l - \tau_k) A_0^T W_{k,l} A_m -$$

$$\sum_{k=0}^{m-1} N_1^{k,m} + \sum_{k=0}^{m-1} \sum_{l=k+1}^{m} (\tau_l - \tau_k) X_{1,m+1}^{k,l} + \left(\sum_{k=1}^{m} N_{m+1}^{0,k}\right)^T$$

$$S_{i,m+1} = \sum_{k=0}^{m-1} \sum_{l=k+1}^{m} (\tau_l - \tau_k) A_{i-1}^T W_{k,l} A_m + \left(\sum_{k=i}^{m} N_{m+1}^{i-1,k}\right)^T - \sum_{k=0}^{m-1} N_i^{k,m} +$$

$$\sum_{k=0}^{m-1} \sum_{l=k+1}^{m} (\tau_l - \tau_k) X_{i,m+1}^{k,l} - \left(\sum_{k=0}^{i-2} N_{m+1}^{k,m}\right)^T i=2,3,\ldots,m-1,m$$

$$X_{i,j} = \begin{bmatrix} X_{i,j}^{1,1} & \cdots & X_{1,m}^{i,j} & X_{1,m+1}^{i,j} \\ \vdots & \ddots & \cdots & \cdots \\ \left(X_{1,m}^{i,j}\right)^T & \vdots & X_{m,m}^{i,j} & X_{m,m+1}^{i,j} \\ \left(X_{1,m+1}^{i,j}\right)^T & \vdots & \left(X_{m,m+1}^{i,j}\right)^T & X_{m+1,m+1}^{i,j} \end{bmatrix}$$

$$X_{k,l}^{i,j} \in R^{n \times n}, \ 0 \le i < j \le m, \ 0 \le k < l \le m+1$$

$$M_{i,j} = \begin{bmatrix} X_{1,1}^{i,j} & \cdots & X_{1,m+1}^{i,j} & N_1^{i,j} \\ \vdots & \ddots & \cdots & \cdots \\ \left(X_{1,m+1}^{i,j}\right)^T & \vdots & X_{m+1,m+1}^{i,j} & N_{m+1}^{i,j} \\ \left(N_1^{i,j}\right)^T & \vdots & \left(N_{m+1}^{i,j}\right)^T & W_{i,j} \end{bmatrix}.$$

Criterion 2 is a multi-delay stability criterion for the power system not containing free-weighting matrices.

Criterion 2: For a system with m time delays, if there exist positive definite matrices $P \in R^{n \times n}$ and $Q_i \in R^{n \times n}$ (where $i=1, 2, \ldots, m$) and semi-positive definite matrices $W_{i,j} \in R^{n \times n}$ (where $i=1, 2, \ldots, m$), the following matrix inequality is established:

$$H = \begin{bmatrix} H_{1,1} & \cdots & H_{1,m} & H_{1,m+1} \\ \vdots & \ddots & \cdots & \cdots \\ H_{1,m}^T & \vdots & H_{m,m} & H_{m,m+1} \\ H_{1,m+1}^T & \vdots & H_{m,m+1}^T & H_{m+1,m+1} \end{bmatrix} < O, \tag{30}$$

where $$H_{1,1} = PA_0 + A_0^T P + \sum_{k=1}^{m} Q_k + \sum_{k=1}^{m} (\tau_k - \tau_{k-1})^2 A_0^T W_k A_0 - W_1$$

$$H_{i,i} = -Q_{i-1} + \sum_{k=1}^{m} (\tau_k - \tau_{k-1})^2 A_{i-1}^T W_k A_{i-1} - W_i - W_{i-1},$$
$$i=2,3,\ldots,m-1,m$$

$$H_{m+1,m+1} = -Q_m + \sum_{k=1}^{m} (\tau_k - \tau_{k-1})^2 A_m^T W_k A_m - W_m$$

$$H_{1,2} = PA_1 + \sum_{k=1}^{m} (\tau_k - \tau_{k-1})^2 A_0^T W_k A_1 + W_1$$

$$H_{i,i+1} = \sum_{k=1}^{m} (\tau_k - \tau_{k-1})^2 A_{i-1}^T W_k A_i + W_i, \ i=2,3,\ldots,m-1,m$$

$$H_{i,j} = PA_{j-1} + \sum_{k=1}^{m} (\tau_k - \tau_{k-1})^2 A_0^T W_k A_{j-1}, \ j=3,4,\ldots,m,m+1$$

$$H_{i,j} = \sum_{k=1}^{m} (\tau_k - \tau_{k-1})^2 A_{i-1}^T W_k A_{j-1}, \ 2 \le i < i+2 \le j \le m+1.$$

Criterion 3 is a multi-delay stability criterion for the power system with quadratic integral terms.

Criterion 3: If there exist positive definite matrices $P \in R^{(2m+1)n \times (2m+1)n}$, $U_i \in R^{n \times n}$ and $Y_i \in R^{2n \times 2n}$ and semi-positive definite matrices $Q_i \in R^{2n \times 2n}$ and $Z_i \in R^{2n \times 2n}$, (where $i=1, 2, \ldots, m$), the following matrix is negative definite as:

$$\left(C_1 P C_2^T + C_2 P C_1^T\right) +$$

$$\sum_{i=1}^{m} \left\{ \begin{bmatrix} e_1 & A_c^T \end{bmatrix} (Q_i + \tau_i^2 Z_i) \begin{bmatrix} e_1^T \\ A_c \end{bmatrix} - [e_{i+2m+1} \ e_1 - e_{i+1}] Z_i \begin{bmatrix} e_{i+2m+1}^T \\ e_1^T - e_{i+1}^T \end{bmatrix} - \right.$$

$$2(\tau_i e_1 - e_{i+2m+1})$$

$$\left. U_i(\tau_i e_1^T - e_{i+2m+1}^T) + \frac{1}{2} \tau_i^4 A_c^T U_i A_c - [e_{i+1} \ e_{i+2m+1}] Q_i \begin{bmatrix} e_{i+1}^T \\ e_{i+2m+1}^T \end{bmatrix} \right\} +$$

Figure 2:
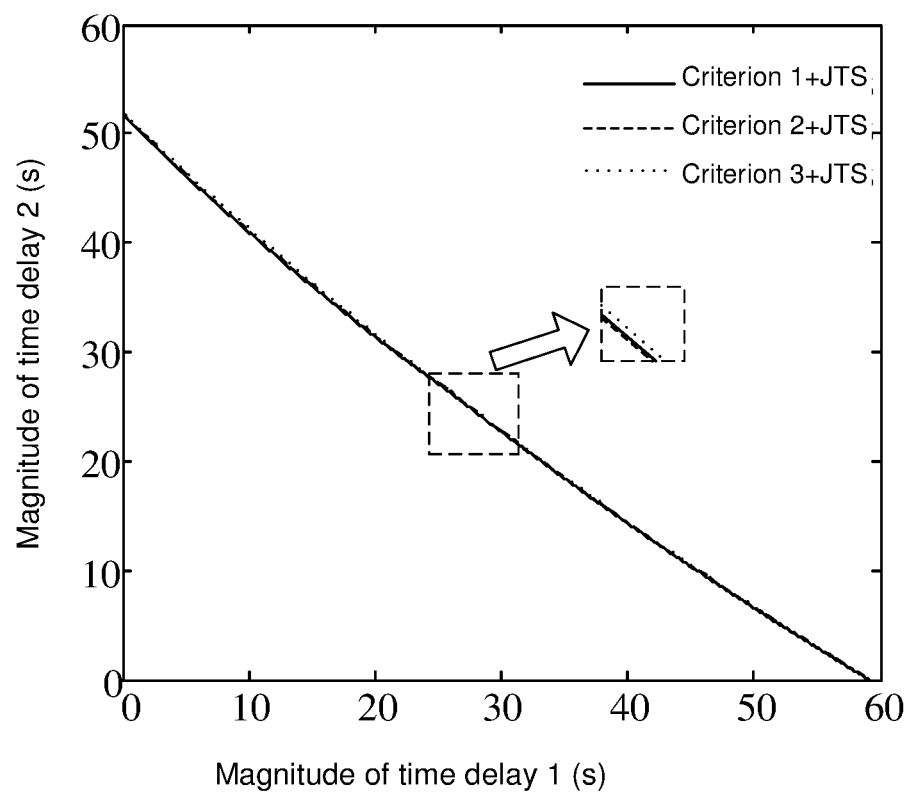
FIG. 2 is a diagram showing the time-delay stability margin of the WSCC 3-generator-9-bus power system which is calculated by a JTS fast solution method of the present invention through three criteria.

FIG. 1 shows the time-delay stability margin obtained by direct solution, and FIG. 2 shows the time-delay stability margin obtained by the JTS fast solution method.

It can be seen from FIGS. 1, 2 that the time-delay stability margin of the WSCC 3-generator-9-bus power system obtained by the JTS fast solution method almost consistent with the curves obtained by the direct solution, expect for very few points.

To compare the time consumption of the criteria, the parameter θ and the Calculation Efficiency Increasing Rate (CEIR) are defined as follows:

$$\theta = \arctan \frac{\tau_2}{\tau_1} \quad (24)$$

$$CEIR = \left( \frac{\text{time consumption for the direction solution}}{\text{time consumption for the JTS solution}} - 1 \right) \times 100\% \quad (25)$$

As θ increases from 0° to 90°, Table 1 shows the corresponding calculation time and CEIR value.

TABLE 1

Comparison of the calculation time of the WSCC 3-generator-9-bus power system

| | Criterion 1 | | | Criterion 2 | | | Criterion 3 | | |
|---|---|---|---|---|---|---|---|---|---|
| θ (°) | Time consumption for the direct solution (s) | Time consumption for the JTS solution (s) | CEIR (%) | Time consumption for the direct solution (s) | Time consumption for the JTS solution (s) | CEIR (%) | Time consumption for the direct solution (s) | Time consumption for the JTS solution (s) | CEIR (%) |
| 0 | 1684.74 | 5.25 | 31990.29 | 4.01 | 0.18 | 2127.78 | 1520.45 | 32.26 | 4613.11 |
| 5 | 797.08 | 7.35 | 10744.63 | 4.94 | 0.28 | 1664.29 | 1449.73 | 51.45 | 2717.75 |
| 10 | 760.27 | 7.51 | 10023.44 | 5.13 | 0.27 | 1800.00 | 1189.73 | 53.69 | 2115.92 |
| 15 | 764.67 | 7.85 | 9641.02 | 5.03 | 0.27 | 1762.96 | 1183.96 | 53.51 | 2123.81 |
| 20 | 955.95 | 8.16 | 11615.07 | 4.98 | 0.25 | 1892.00 | 1173.72 | 54.23 | 2064.34 |
| 25 | 988.62 | 7.82 | 12542.20 | 4.71 | 0.25 | 1784.00 | 1308.21 | 50.94 | 2468.14 |
| 30 | 1069.53 | 7.20 | 14754.58 | 4.74 | 0.25 | 1796.00 | 1178.65 | 52.80 | 2132.29 |
| 35 | 1086.09 | 7.20 | 14984.58 | 4.88 | 0.26 | 1776.92 | 1236.65 | 53.31 | 2219.73 |
| 40 | 1135.73 | 6.40 | 17645.78 | 4.84 | 0.26 | 1761.54 | 1177.16 | 49.80 | 2263.78 |
| 45 | 1554.47 | 5.16 | 30025.39 | 5.05 | 0.15 | 3266.67 | 1457.12 | 35.10 | 4051.34 |
| 50 | 756.22 | 5.47 | 13724.86 | 4.68 | 0.27 | 1633.33 | 1294.02 | 51.33 | 2420.98 |
| 55 | 1098.28 | 5.42 | 20163.47 | 4.96 | 0.26 | 1807.69 | 1202.27 | 50.55 | 2278.38 |
| 60 | 1059.77 | 5.32 | 19820.49 | 4.68 | 0.27 | 1633.33 | 1193.42 | 50.26 | 2274.49 |
| 65 | 1093.70 | 5.83 | 18659.86 | 4.50 | 0.28 | 1507.14 | 1351.91 | 52.34 | 2482.94 |
| 70 | 1099.70 | 6.21 | 17608.53 | 4.65 | 0.26 | 1688.46 | 1233.85 | 49.49 | 2393.13 |
| 75 | 1065.65 | 6.18 | 17143.53 | 4.66 | 0.30 | 1453.33 | 1202.73 | 53.05 | 2167.16 |
| 80 | 1026.90 | 5.87 | 17394.04 | 4.64 | 0.29 | 1500.00 | 1187.11 | 50.97 | 2229.04 |
| 85 | 990.41 | 4.95 | 19908.28 | 4.42 | 0.28 | 1478.57 | 1124.02 | 54.34 | 1968.49 |
| 90 | 1886.84 | 4.69 | 40131.13 | 2.99 | 0.15 | 1893.33 | 1428.35 | 36.98 | 3762.49 |

-continued $$\sum_{i=2}^{m} \left\{ (\tau_i - \tau_{i-1})^2 [e_1 \ A_c^T] Y_{i-1} \begin{bmatrix} e_1^T \\ A_c \end{bmatrix} - \right.$$

$$\left. [e_{i+2m+1} - e_{i+2m} \ e_i - e_{i+1}] Y_{i-1} \begin{bmatrix} e_{i+2m+1}^T - e_{i+2m}^T \\ e_i^T - e_{i+1}^T \end{bmatrix} \right\},$$

so the power system with m time delays is asymptotically stable, where:

$A_c = [A_0 \ A_1 \ A_2 \ldots A_{m-1} \ A_m \ 0 \ldots 0]$, $C_1 = [e_1 \ e_2 \ e_3 \ldots e_m \ e_{m+1} \ e_{m+2} \ e_{2m+2} \ e_{2m+3} \ldots e_{3m} \ e_{3m+1}]$, $C_2 = [A_c^T \ e_{m+2} \ e_{m+3} \ldots e_{2m} \ e_{2m+1} \ e_1 - e_2 \ e_1 - e_3 \ldots e_1 - e_m \ e_1 - e_{m+1}]$.

It can be seen from Table 1 that the calculation time can be greatly reduced by simplifying the WSCC 3-generator-9-bus power system with multiple time delays by the JTS fast solution method of the present invention and then calculating the time-delay stability margin by the stability criteria. When θ varies from 0° to 90°, the maximum value of the CEIR under the criterion 1 can reach 40131.13%, the maximum value of the CEIR under the criterion 2 can reach 3266.67%, and the maximum value of the CEIR under the criterion 3 can reach 4613.11%, so that it is indicated that the JTS method has an obvious fast determination effect.

To explore the fast solution principle of the JTS method, the calculation of the time-delay stability margin of the WSCC 3-generator-9-bus power system under the criterion 1 is taken as an example. By applied the JTS method, there are 4×4 unknown matrices, i.e., P, $Q_1$, $Q_2$, $W_1$, $W_2$, $W_3$, $X_{11}$, $X_{22}$, $X_{33}$, $Y_{11}$, $Y_{22}$, $Y_{33}$, $Z_{11}$, $Z_{22}$ and $Z_{33}$, and 4×4 unknown appropriate matrices, i.e., $N_1$, $N_2$, $N_3$, $S_1$, $S_2$, $S_3$, $T_1$, $T_2$, $T_3$, $X_{12}$, $X_{13}$, $X_{23}$, $Y_{12}$, $Y_{13}$, $Y_{23}$, $Z_{12}$, $Z_{13}$ and $Z_{23}$ to be solved in the criterion 1. Thus, the number of unknown variables $N_1$ is as follows:

$$N_1 = 15 \times \frac{(4+1) \times 4}{2} + 18 \times 4 \times 4 = 438. \quad (26)$$

For the direct solution using the criteria, there are 15 10×10 symmetric matrices and 18 10×10 appropriate matrixes among the unknown variable matrices. Thus, the number of unknown variable matrices $N_2$ is as follows:

$$N_2 = 15 \times \frac{(10+1) \times 10}{2} + 18 \times 10 \times 10 = 2625. \quad (27)$$

The total number of unknown variables by applying the JTS method is about ⅙ of the total number of unknown variables in the case of not using the JTS method. As a result, the amount of calculation is directly reduced, and the calculation efficiency is higher. The analysis on the other two criteria is similar to the above situation. The reduction rate of the unknown variables is 83.31%, 81.82% and 83.16% under the criteria 1, 2, 3, respectively. It can be seen that, by the JTS fast solution method, the number of unknown variables can be greatly reduced and the calculation efficiency can be improved.

Figure 3:
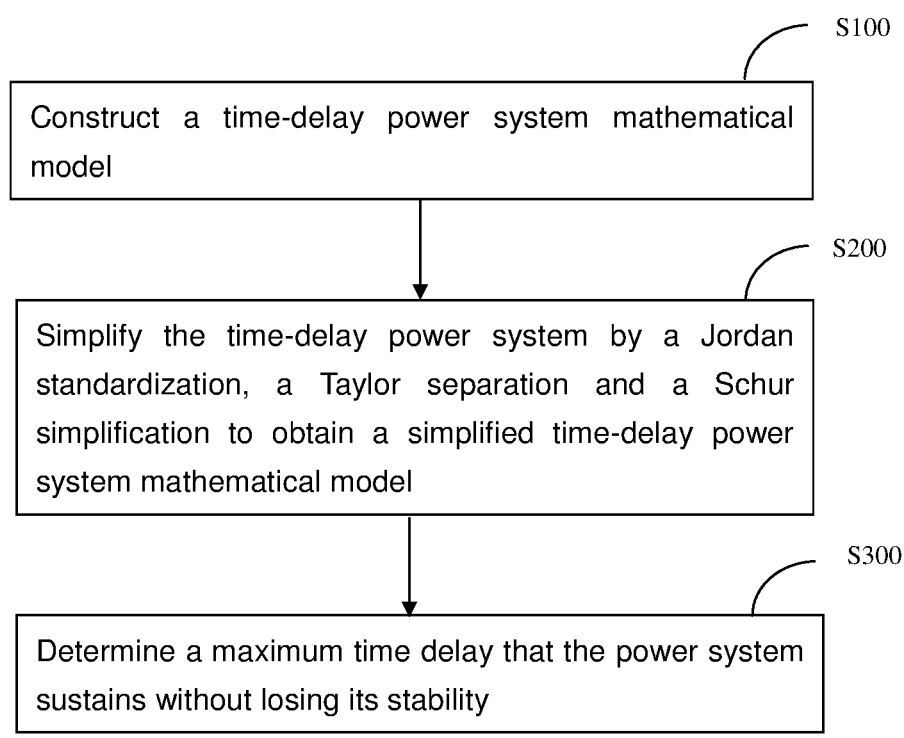
FIG. 3 is a flowchart illustrating a method of fast determining a time-delay stability margin of a power system.

With reference to FIG. 3, a method of fast determining a time-delay stability margin of a power system is described, including the following steps:

S100: Construct a time-delay power system mathematical model;

S200: Simplify the time-delay power system by a Jordan standardization, a Taylor separation and a Schur simplification to obtain a simplified time-delay power system mathematical model; and S300: Determine a maximum time delay that the power system sustains without losing its stability.

Figure 4:
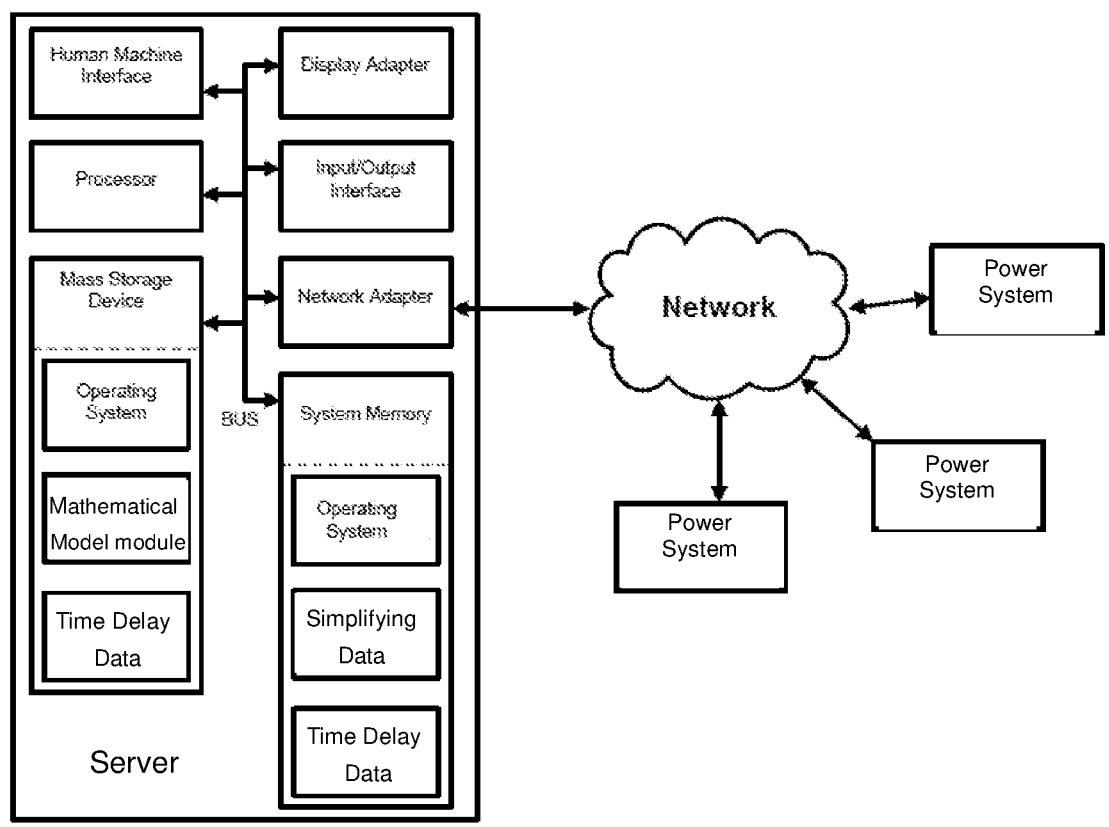
FIG. 4 is a block diagram illustrating a computing system in which the present system and method can operate.

Referring to FIG. 1 FIG. 4, the methods and systems of the present disclosure can be implemented on one or more computers or processors. The methods and systems disclosed can utilize one or more computers or processors to perform one or more functions in one or more locations. The processing of the disclosed methods and systems can also be performed by software components. The disclosed systems and methods can be described in the general context of computer-executable instructions such as program modules, being executed by one or more computers or devices. For example, each server or computer processor can include the program modules such as mathematical construction module, simplifying module, and maximum delay calculation module, and other related modules described in the above specification. These program modules or module related data can be stored on the mass storage device of the server and one or more client devices. Each of the operating modules can comprise elements of the programming and the data management software.

The components of the server can comprise, but are not limited to, one or more processors or processing units, a system memory, a mass storage device, an operating system, a system memory, an Input/output Interface, a display device, a display interface, a network adaptor, and a system bus that couples various system components. The server and one or more power systems can be implemented over a wired or wireless network connection at physically separate locations, implementing a fully distributed system. By way of example, a server can be a personal computer, portable computer, smartphone, a network computer, a peer device, or other common network node, and so on. Logical connections between the server and one or more power systems can be made via a network, such as a local area network (LAN) and/or a general wide area network (WAN).

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip.

The term module may include memory (shared, dedicated, or group) that stores code executed by the processor. The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system. The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof. The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A system for determining a time-delay stability margin of a power system, for a time-delay power system with time delays, the system comprising:
   three generators;
   an excitation regulator;
   a controller configured to perform feedback control of the power system;
   a processor configured to execute a method for determining the time-delay stability margin of the power system (JTS fast solution), comprising:
   constructing a time-delay power system mathematical model via a processor, wherein two generators out of the three generators are treated as equivalent units of a power grid with a wide-area control loop; a time delay $\tau_1$ exists in a feedback of a first terminal voltage measured on a first bus to the excitation regulator, and a time delay $\tau_2$ exists in a feedback of a second terminal voltage measured on a second bus to the excitation regulator;
   constructing a differential algebraic equation set of the power system with time delays:

$$\begin{cases} \dot{s} = f(s, s_1, s_2, y, y_1, y_2) \\ 0 = g(s, y) \\ 0 = g(s_i, y_i), \; i = 1, 2 \end{cases} \tag{0}$$

where $s \in R^n$ is an original state variable of the system, $y \in R^r$ is an original algebraic variable of the system, $s_i = s(t-\tau_i)$ (where i=1,2) is an original delay state variable of the system, $y_i = y(t-\tau_i)$ (where i=1,2) is an original delay algebraic variable of the system; and, $\tau_i \in R$ (where i=1,2) is a time delay constant of the system;
   simplifying the time-delay power system by a Jordan standardization, a Taylor separation and a Schur simplification to obtain a simplified time-delay power system mathematical model to determine a time-delay stability margin of the time-delay power system; and
   determining a maximum time delay that the power system sustains without losing stability of the power system via the processor;
   a memory configured to be in signal communication with the processor, wherein the processor is configured for:
   storing the time-delay power system mathematical model and simplified time-delay power system mathematical model, the time-delay stability margin and determined maximum time delay of the power system; and
   applying the time-delay stability margin and the maximum time delay to design the controller of the power system having the time delay $\tau_1$ and the time delay $\tau_2$, thereby enhancing performance of the controller and resulting in the stability of the power system from enhanced performance of the controller to perform the feedback control of the power system, wherein
   calculation Efficiency Increasing Rate (CEIR) are defined as follows:

$$CEIR = \left( \frac{\text{time comsumption for a direction solution}}{\text{time consumption for the } JTS \text{ fast solution}} - 1 \right) \times 100\% \tag{1}$$

with a first criterion for the power system containing free-weighting matrices, the CEIR is up to 40131.13%;
with a second criterion for the power system not containing free-weighting matrices, the CEIR is up to 3266.67%; and
with a third criterion for the power system with quadratic integral terms, the CEIR is up to 4616.11%.

2. The system of claim 1, wherein the time-delay power system mathematical model includes:

$$\begin{cases} \dfrac{dx(t)}{dt} = A_o x(t) + \sum_{i=1}^{2} A_i x(t-\tau_i), \; \tau_i > 0 \\ x(t+\xi) = h(t, \xi), \; \xi \in [-\max(\tau_i), 0) \end{cases} \tag{2}$$

where t is a time variable; x(t) is a state variable;

$$\frac{dx(t)}{dt}$$

is the derivative of the state variable with regard to the time; $A_0$ is a non-delay coefficient matrix; $A_i$ (where i=1,2) is a delay coefficient matrix; $\tau_i$ (where i=1,2) is a delay constant of the system; $\tau_i > 0$ indicates that all time delays are greater than 0; $x(t-\tau_i)$ (where i=1,2) is a delay state variable; $h(t,\xi)$ is a historic trajectory of the state variable x(t); $\xi \in [-\max(\tau_i), 0)$ indicates that the variable $\xi$ varies between the opposite number of the maximum value of $\tau_i$ and 0; and, all algebraic variables belong to a real number field R, and all vector variables belong to an 10-dimension real number vector $R^{10}$.

3. The system of claim 2, wherein simplifying the time-delay power system includes
   summing up delay coefficient matrices $A_i$ (where i=1,2) in the claim 2;
   performing Jordan standardization by the sparity of the delay coefficient matrices;
   performing row-column transformation on the time-delay power system mathematical model according to the sparity to obtain an updated non-delay variable $\tilde{z}(t)$ and an updated delay state variable $\tilde{z}(t-\tau_i)$;
   performing Taylor expansion on the updated delay state variable $\tilde{z}(t-\tau_i)$ subjected to the row-column transformation, separating the correlation between the updated non-delay variable $\tilde{z}(t)$ and the updated delay state variable $\tilde{z}(t-\tau_i)$ in the time-delay power system mathematical model that is after the Jordan standardization and the sparity row-column transformation; and
   simplifying the time-delay power system mathematical model by a Schur model, so that the number of state variables is decreased from 10 to 4, and obtaining a simplified time-delay power system mathematical model.

4. The system of claim 3, wherein performing Taylor expansion further includes:

performing Taylor expansion on the updated delay state variable $\tilde{z}(t-\tau_i)$ in the equation (11):

$$\begin{bmatrix} \tilde{z}_{res}(t-\tau_i) \\ \tilde{z}_{unres}(t-\tau_i) \end{bmatrix} = \begin{bmatrix} \tilde{z}_{res}(t) \\ \tilde{z}_{unres}(t) \end{bmatrix} - \tau_i \begin{bmatrix} \dot{\tilde{z}}_{res}(t) \\ \dot{\tilde{z}}_{unres}(t) \end{bmatrix} + \sum_{l=2}^{\infty} \frac{(-\tau_i)^l}{l!} \begin{bmatrix} \tilde{z}_{res}^{(l)}(t) \\ \tilde{z}_{unres}^{(l)}(t) \end{bmatrix}; \quad (12)$$

substituting the first equation $$\frac{d\tilde{z}(t)}{dt} = \tilde{A}_0 \tilde{z}(t) + \sum_{i=1}^{m} \tilde{A}_i \tilde{z}(t-\tau_i)$$

in the equation (11) into the equation (12) to obtain:

$$\begin{bmatrix} \dot{\tilde{z}}_{res}(t) \\ \dot{\tilde{z}}_{unres}(t) \end{bmatrix} = \tilde{A}_0 \begin{bmatrix} \tilde{z}_{res}(t) \\ \tilde{z}_{unres}(t) \end{bmatrix} \quad (13)$$

$$\sum_{i=1}^{m} \tilde{A}_i \left\{ \begin{bmatrix} \tilde{z}_{res}(t) \\ \tilde{z}_{unres}(t) \end{bmatrix} - \tau_i \begin{bmatrix} \dot{\tilde{z}}_{res}(t) \\ \dot{\tilde{z}}_{unres}(t) \end{bmatrix} + \sum_{l=2}^{\infty} \frac{(-\tau_i)^l}{l!} \begin{bmatrix} \tilde{z}_{res}^{(l)}(t) \\ \tilde{z}_{unres}^{(l)}(t) \end{bmatrix} \right\};$$

combining similar variables in the equation (13):

$$\left\{ I_{n \times n} + \sum_{i=1}^{m} \tau_i \begin{bmatrix} \tilde{A}_{i1}^1 & O_{r \times (n-r)} \\ O_{(n-r) \times r} & O_{(n-r) \times (n-r)} \end{bmatrix} \right\} \cdot \begin{bmatrix} \dot{\tilde{z}}_{res}(t) \\ \dot{\tilde{z}}_{unres}(t) \end{bmatrix} = \quad (14)$$

$$\left\{ \tilde{A}_0 + \sum_{i=1}^{m} \begin{bmatrix} \tilde{A}_{i1}^1 & O_{r \times (n-r)} \\ O_{(n-r) \times r} & O_{(n-r) \times (n-r)} \end{bmatrix} \right\} \cdot \begin{bmatrix} \tilde{z}_{res}(t) \\ \tilde{z}_{unres}(t) \end{bmatrix} +$$

$$\sum_{i=1}^{m} \begin{bmatrix} \tilde{A}_{i1}^1 & O_{r \times (n-r)} \\ O_{(n-r) \times r} & O_{(n-r) \times (n-r)} \end{bmatrix} \cdot \left\{ \sum_{l=2}^{\infty} \frac{(-\tau_i)^l}{l!} \begin{bmatrix} \tilde{z}_{res}^{(l)}(t) \\ \tilde{z}_{unres}^{(l)}(t) \end{bmatrix} \right\},$$

where, since $$\left\{ I_{n \times n} + \sum_{i=1}^{m} \tau_i \begin{bmatrix} \tilde{A}_{i1}^1 & O_{r \times (n-r)} \\ O_{(n-r) \times r} & O_{(n-r) \times (n-r)} \end{bmatrix} \right\}$$

is invertible, multiplying both sides of the equation (14) by the inverse matrix of $$\left\{ I_{n \times n} + \sum_{i=1}^{m} \tau_i \begin{bmatrix} \tilde{A}_{i1}^1 & O_{r \times (n-r)} \\ O_{(n-r) \times r} & O_{(n-r) \times (n-r)} \end{bmatrix} \right\}$$

to obtain a time-delay power system mathematical model subjected to the Taylor separation:

$$\begin{bmatrix} \dot{\tilde{z}}_{res}(t) \\ \dot{\tilde{z}}_{unres}(t) \end{bmatrix} = \left\{ I_{n \times n} + \sum_{i=1}^{m} \tau_i \begin{bmatrix} \tilde{A}_{i1}^1 & O_{r \times (n-r)} \\ O_{(n-r) \times r} & O_{(n-r) \times (n-r)} \end{bmatrix} \right\}^{-1} \cdot \quad (15)$$

$$\left\{ \tilde{A}_0 + \sum_{i=1}^{m} \begin{bmatrix} \tilde{A}_0^1 & O_{r \times (n-r)} \\ O_{(n-r) \times r} & O_{(n-r) \times (n-r)} \end{bmatrix} \right\} \cdot \begin{bmatrix} \tilde{z}_{res}(t) \\ \tilde{z}_{unres}(t) \end{bmatrix} +$$

$$\left\{ I_{n \times n} + \sum_{i=1}^{m} \tau_i \begin{bmatrix} \tilde{A}_{i1}^1 & O_{r \times (n-r)} \\ O_{(n-r) \times r} & O_{(n-r) \times (n-r)} \end{bmatrix} \right\}^{-1} \cdot$$

$$\sum_{i=1}^{m} \begin{bmatrix} \tilde{A}_{i1}^1 & O_{r \times (n-r)} \\ O_{(n-r) \times r} & O_{(n-r) \times (n-r)} \end{bmatrix} \cdot \left\{ \sum_{l=2}^{\infty} \frac{(-\tau_i)^l}{l!} \begin{bmatrix} \tilde{z}_{res}^{(l)}(t) \\ \tilde{z}_{unres}^{(l)}(t) \end{bmatrix} \right\} =$$

$$\left\{ I_{n \times n} + \sum_{i=1}^{m} \tau_i \begin{bmatrix} \tilde{A}_{i1}^1 & O_{r \times (n-r)} \\ O_{(n-r) \times r} & O_{(n-r) \times (n-r)} \end{bmatrix} \right\}^{-1} \cdot$$

$$\left\{ \tilde{A}_0 + \sum_{i=1}^{m} \begin{bmatrix} \tilde{A}_{i1}^1 & O_{r \times (n-r)} \\ O_{(n-r) \times r} & O_{(n-r) \times (n-r)} \end{bmatrix} \right\} \cdot \begin{bmatrix} \tilde{z}_{res}(t) \\ \tilde{z}_{unres}(t) \end{bmatrix} +$$

$$\left\{ I_{n \times n} + \sum_{i=1}^{m} \tau_i \begin{bmatrix} \tilde{A}_{i1}^1 & O_{r \times (n-r)} \\ O_{(n-r) \times r} & O_{(n-r) \times (n-r)} \end{bmatrix} \right\}^{-1} \cdot$$

$$\sum_{i=1}^{m} \begin{bmatrix} \tilde{A}_{i1}^1 \\ O_{(n-r) \times r} \end{bmatrix} \cdot \left\{ \sum_{l=2}^{\infty} \frac{(-\tau_i)^l}{l!} \begin{bmatrix} \tilde{z}_{res}^{(l)}(t) \\ \tilde{z}_{unres}^{(l)}(t) \end{bmatrix} \right\},$$

wherein m is equal to 2 and n is equal to 10.

5. The system of claim 3, wherein simplifying the time-delay power system mathematical model by an Schur model further includes converting the time-delay power system mathematical model subjected to the Taylor separation into an input-output form:

$$\begin{cases} \dot{\tilde{z}}(t) = \overline{A}_0 \tilde{z}(t) + \overline{B}_0 u(t) \\ y(t) = [I_{r \times r} \; O_{r \times (n-r)}] \tilde{z}(t) \end{cases}, \quad (16)$$

where:

$$\overline{A}_0 = \left\{ I_{n \times n} + \sum_{i=1}^{m} \tau_i \begin{bmatrix} \tilde{A}_{i1}^1 & O_{r \times (n-r)} \\ O_{(n-r) \times r} & O_{(n-r) \times (n-r)} \end{bmatrix} \right\}^{-1} \cdot$$

$$\left\{ \tilde{A}_0 + \sum_{i=1}^{m} \begin{bmatrix} \tilde{A}_{i1}^1 & O_{r \times (n-r)} \\ O_{(n-r) \times r} & O_{(n-r) \times (n-r)} \end{bmatrix} \right\}$$

$$\overline{B}_0 = [\overline{B}_1 \; \overline{B}_2 \; \ldots \; \overline{B}_i \; \ldots \; \overline{B}_{m-1} \; \overline{B}_m]$$

$$\overline{B}_i = \left\{ I_{n \times n} + \sum_{i=1}^{m} \tau_i \begin{bmatrix} \tilde{A}_{i1}^1 & O_{r \times (n-r)} \\ O_{(n-r) \times r} & O_{(n-r) \times (n-r)} \end{bmatrix} \right\}^{-1} \cdot$$

$$\sum_{i=1}^{m} \begin{bmatrix} \tilde{A}_{i1}^1 \\ O_{(n-r) \times r} \end{bmatrix}, i = 1, 2,$$

$$u = [u_1^T \; u_2^T \; \ldots \; u_i^T \; \ldots \; u_{m-1}^T \; u_m^T]^T, i = 1, 2,$$

-continued $$u_i(t) = \sum_{l=2}^{\infty} \frac{(-\tau_i)^l}{l!} z_{res}^{(i)}(t);$$

performing Schur simplification in the equation (16) to decrease the number of state variables from 10 to 4:

$$\begin{cases} \dot{z}_{red}(t) = A_{red}z_{red}(t) + B_{red}u(t) \\ y(t) = C_{red}z_{red}(t) \end{cases} \quad (17)$$

where $z_{red}(t) \in R^r$, $y(t) \in R^r$, $A_{red} \in R^{r \times r}$, $B_{red,i} \in R^{r \times r}$, $C_{red} \in R^{r \times r}$, and $B_{red} = [B_{red,1}, B_{red,2} \ldots B_{red,i} \ldots B_{red,m-1} B_{red,m}]$;

in accordance with the equation (16), substituting $y(t) = \tilde{z}_{res}(t)$ into the equation (17):

$$\begin{cases} \dot{z}_{red}(t) = A_{red}z_{red}(t) + B_{red}u(t) \\ \tilde{z}_{res}(t) = C_{red}z_{red}(t) \end{cases} \quad (18)$$

substituting the second equation $\tilde{z}_{res}(t) = C_{red}z_{red}(t)$ in the equation (18) into the first equation $\dot{z}_{red}(t) = A_{red}z_{red}(t) + B_{red}u(t)$ to obtain:

$$\dot{\tilde{z}}_{res}(t) = C_{red}A_{red}C_{red}^{-1}\tilde{z}_{res}(t) + C_{red}B_{red}u(t) \quad (19);$$

expanding each input component $u_i(t)$ of input $u(t)$ in the equation (16) according to the Taylor separation:

$$u_i(t) = \sum_{l=2}^{\infty} \frac{(-\tau_i)^l}{l!} z_{res}^{(i)}(t) \quad (20)$$

$$u_i(t) = \sum_{l=0}^{\infty} \frac{(-\tau_i)^l}{l!} z_{res}^{(l)}(t) - z_{res}^{(0)}(t) - \frac{(-\tau_i)^1}{1!} z_{res}^{(1)}(t)$$

$$u_i(t) = \tilde{z}_{res}(t - \tau_i) - \tilde{z}_{res}(t) + \tau_i \dot{\tilde{z}}_{res}(t);$$

and substituting all input components into the equation (18) to eventually obtain a simplified time-delay power system mathematical model:

$$\begin{cases} \dfrac{d\tilde{z}_{res}(t)}{dt} = A_{0,res}\tilde{z}_{res}(t) + \sum_{i=1}^{m} A_{i,res}\tilde{z}_{res}(t - \tau_i) \\ x(t+\xi) = h(t,\xi), \xi \in [-\max(\tau_i), 0) \end{cases} \quad (21)$$

where $$A_{0,res} = \left(I_{r \times r} - \sum_{i=1}^{m} \tau_i C_{red}B_{red,i}\right)^{-1} \left(C_{red}A_{red}C_{red}^{-1} - \sum_{i=1}^{m} C_{red}B_{red,i}\right),$$

$$A_{i,res} = \left(I_{r \times r} - \sum_{i=1}^{m} \tau_i C_{red}B_{red,i}\right)^{-1} C_{red}B_{red,i},$$

wherein m is equal to 2 and n is equal to 10.

6. The system of claim 2, wherein obtaining a maximum time delay that the power system includes
based on the time-delay stability criteria for the power system, obtaining the time-delay stability margin of the time-delay power system with m time delays by the simplified time-delay power system mathematical model obtained, thus achieving the determination of the time-delay stability margin of the power system; and
obtaining the maximum time delay that the power system sustains without losing stability of the power system.

7. The system of claim 6, wherein the time-delay stability criteria for the power system comprises one of the following two situations:
(1) Layapunov stability criteria; and
(2) eigenvalue analysis stability criteria.

8. The system of claim 2, wherein constructing the time-delay power system mathematical model further comprising:
linearizing the equation n in an equilibrium point $(x_e, y_e)$ to obtain:

$$\begin{cases} \Delta \dot{s} = F_s \Delta s + F_y \Delta y + \Sigma_{i=1}^m (F_{si}\Delta s_i + F_{yi}\Delta y_i) \\ 0 = G_s \Delta s + G_y \Delta y \\ 0 = G_{si}\Delta s_i + G_{yi}\Delta y_i, \ i = 1, 2, \end{cases}, \text{where} \quad (3)$$

$$F_s = \frac{\partial f}{\partial s}, F_y = \frac{\partial f}{\partial y}, G_s = \frac{\partial g}{\partial s}, G_y = \frac{\partial g}{\partial y},$$

$$F_{si} = \frac{\partial f}{\partial s_i}, F_{yi} = \frac{\partial f}{\partial y_i}, G_{si} = \frac{\partial g}{\partial s_i}, \text{ and } G_{yi} = \frac{\partial g}{\partial y_i},$$

where $i=1,2$; $m=2$; and, $\Delta s$, $\Delta y$, $\Delta s_i$ and $\Delta y_i$ are increments nearby the equilibrium point;
without considering the singularity, $G_y$ and $G_{yi}$ in the equation (3) are invertible, expressing the equation (3) as:

$$\Delta \dot{s} = A_0 \Delta s + \Sigma_{i=1}^m A_i \Delta s(t-\tau_i) \quad (4),$$

where $A_0 = F_s - F_y G_y^{-1} G_s$ and $A_i = F_{si} - F_{yi} G_{yi}^{-1} G_{si}$;
expressing the increment of the state variable by $x(t) = \Delta z$, rewriting the equation (4) as:

$$\frac{dx(t)}{dt} = A_0 x(t) + \sum_{i=1}^{2} A_i x(t-\tau_i); \quad (5)$$

and
expressing the time-delay power system mathematical model as follows:

$$\begin{cases} \dfrac{dx(t)}{dt} = A_0 x(t) + \sum_{i=1}^{2} A_i x(t-\tau_i), \tau_i > 0 \\ x(t+\xi) = h(t, \xi), \xi \in [-\max(\tau_i), 0) \end{cases} \quad (6)$$

where t is a time variable; x(t) is a state variable;

$$\frac{dx(t)}{dt}$$

is the derivative of the state variable with regard to the time; $A_0$ is the non-delay coefficient matrix; $A_i$ (where i=1,2) is a delay coefficient matrix; $\tau_i$ (where i=1,2) is a delay constant of the system; $\tau_i > 0$ indicates that all time delays are greater than 0; x $(t-\tau_i)$ (where i=1,2) is a delay state variable; h(t,ξ) is a historic trajectory of the state variable x(t); $\xi \in \max(\tau_i), 0)$ indicates that the variable varies between the opposite number of the maximum value of $\tau_i$ and 0; and, all algebraic variables belong to a real number field R, and all vector variables belong to a 10-dimension real number vector $R^{10}$.

9. The system of claim 1, wherein simplifying the time-delay power system further comprising: accumulating the delay coefficient matrix $A_i$ (where i=1,2) to obtain $$\sum_{i=1}^{2} A_i;$$

performing Jordan standardization to the result of accumulation $$\sum_{i=1}^{2} A_i,$$

that is, performing row-column transformation on the sum of the delay coefficient matrix $A_i$ (where i=1,2):

$$T\left(\sum_{i=1}^{m} A_i\right)T^{-1} = J, \tag{7}$$

where T is a row-column transformation matrix;
performing row-row transformation on the first equation $$\frac{dx(t)}{dt} = A_0 x(t) + \sum_{i=1}^{m} A_i x(t - \tau_i)$$

in the power system mathematical model with time delays constructed:

$$\frac{dTx(t)}{dt} = TA_0 x(t) + T\sum_{i=1}^{m} A_i x(t - \tau_i); \tag{8}$$

performing variable substitution on the state variable x(t), setting Tx(t)=z(t), and substituting $x(t)=T^{-1}z(t)$ and $x(t-\tau_i)=T^{-1}z(t-\tau_i)$ into the equation (8) to obtain:

$$\frac{dz(t)}{dt} = A_{0J} z(t) + \sum_{i=1}^{m} A_{iJ} z(t - \tau_i); \tag{9}$$

where $A_{0J} = TA_0 T^{-1}$ and $$A_{iJ} = T\left(\sum_{i=1}^{m} A_i\right)T^{-1} = J;$$

and
according to the sparity of the delay coefficient matrix $A_{iJ}$ in the equation (9), performing row-column transformation on the delay coefficient matrix $A_{iJ}$ based on the following transformation rule: for any variable $z_k$ (where 1≤k≤n), if the value of an element $A_{iJ}$ (i, j) or $A_{iJ}$ (j,i) (where 1≤i≤m and 1≤j≤n) in $A_{iJ}$ is 0, successively arranging the variable $z_k$ as the last variable in the sequence of stage variables to obtain a rearranged state variable $\tilde{z}(t)=[\tilde{z}(t) \; \tilde{z}^T_{unres}(t)]^T$, where $\tilde{z}_{res}(t) \in R^4$ and $\tilde{z}_{unres}(t) \in R^{n-r}$; hence, obtaining the following equation according to the transformation rule:

$$\begin{bmatrix} \dot{\tilde{z}}_{res}(t) \\ \dot{\tilde{z}}_{unres}(t) \end{bmatrix} = \tilde{A}_0 \begin{bmatrix} \tilde{z}_{res}(t) \\ \tilde{z}_{unres}(t) \end{bmatrix} + \tag{10}$$

$$\sum_{i=1}^{m} \tilde{A}_i \begin{bmatrix} \tilde{z}_{res}(t-\tau_i) \\ \tilde{z}_{unres}(t-\tau_i) \end{bmatrix} \text{where } \tilde{A}_i = \begin{bmatrix} \tilde{A}^1_{i1} & O_{r \times (n-r)} \\ O_{(n-r) \times r} & O_{(n-r) \times (n-r)} \end{bmatrix};$$

and
expressing the time-delay power system mathematical model subjected to the Jordan standardization and sparity row-column transformation as follows:

$$\begin{cases} \frac{d\tilde{z}(t)}{dt} = \tilde{A}_0 \tilde{z}(t) + \sum_{i=1}^{m} \tilde{A}_i \tilde{z}(t - \tau_i), \tau_i > 0 \\ \tilde{z}(t+\xi) = \tilde{h}(t, \xi), \xi \in [-\tau_i, 0) \end{cases} \tag{11}$$

wherein m is equal to 2.

* * * * *